US011472965B2

(12) United States Patent
Foster-Bey, Jr. et al.

(10) Patent No.: US 11,472,965 B2
(45) Date of Patent: Oct. 18, 2022

(54) CEMENT RESIN HYBRID PAINT AND COATING

(71) Applicant: Flying Pig Coatings, LLC, Grand Rapids, MI (US)

(72) Inventors: Cyrus Foster-Bey, Jr., Grand Rapids, MI (US); Joel T. Pyper, Holland, MI (US)

(73) Assignee: FLYING PIG COATINGS, LLC, Grand Rapids, MI (US)

( * ) Notice: Subject to any disclaimer, the term of this patent is extended or adjusted under 35 U.S.C. 154(b) by 175 days.

(21) Appl. No.: 16/851,164

(22) Filed: Apr. 17, 2020

(65) Prior Publication Data

US 2020/0239699 A1    Jul. 30, 2020

Related U.S. Application Data

(62) Division of application No. 15/896,716, filed on Feb. 14, 2018, now Pat. No. 10,647,855.

(60) Provisional application No. 62/479,626, filed on Mar. 31, 2017.

(51) Int. Cl.
| | |
|---|---|
| *C09D 1/08* | (2006.01) |
| *C04B 7/02* | (2006.01) |
| *C04B 14/06* | (2006.01) |
| *C04B 14/22* | (2006.01) |
| *C04B 16/04* | (2006.01) |
| *C04B 14/20* | (2006.01) |
| *C04B 28/02* | (2006.01) |
| *C04B 28/04* | (2006.01) |
| *C04B 16/02* | (2006.01) |
| *C04B 111/00* | (2006.01) |
| *C09D 7/40* | (2018.01) |

(52) U.S. Cl.
CPC .............. *C09D 1/08* (2013.01); *C04B 7/02* (2013.01); *C04B 14/06* (2013.01); *C04B 14/20* (2013.01); *C04B 14/22* (2013.01); *C04B 16/04* (2013.01); *C04B 28/02* (2013.01); *C04B 28/04* (2013.01); *C04B 16/02* (2013.01); *C04B 2111/00508* (2013.01); *C09D 7/40* (2018.01)

(58) Field of Classification Search
CPC ......... C04B 7/02; C04B 14/06; C04B 14/066; C04B 14/20; C04B 14/22; C04B 14/106; C04B 14/28; C04B 14/305; C04B 14/308; C04B 16/02; C04B 16/04; C04B 24/2641; C04B 28/02; C04B 28/04; C04B 2103/50; C09D 1/08; C09D 7/40
See application file for complete search history.

(56) References Cited

U.S. PATENT DOCUMENTS

| | | | |
|---|---|---|---|
| 4,430,463 A | | 2/1984 | Mullenax |
| 4,710,526 A | | 12/1987 | Tokumoto |
| 4,993,884 A | * | 2/1991 | Mueller .................. E04G 21/04 406/48 |
| 5,911,819 A | * | 6/1999 | Drs ....................... C04B 24/267 106/725 |
| 9,624,131 B1 | | 4/2017 | Dubey |
| 10,647,855 B2 | * | 5/2020 | Foster-Bey, Jr. ......... C04B 28/02 |
| 2007/0224362 A1 | * | 9/2007 | Briand ................ C04B 41/4853 523/401 |
| 2010/0221418 A1 | | 9/2010 | Stadtbaumer |
| 2011/0003904 A1 | | 1/2011 | Guevara |
| 2016/0289526 A1 | | 10/2016 | Alwattari |

FOREIGN PATENT DOCUMENTS

| | | | | |
|---|---|---|---|---|
| CN | 104291741 A | ‡ | 1/2015 | |
| CN | 104291741 A | | 1/2015 | |
| DE | 2039140 A | * | 2/1972 | ............. C04B 12/04 |
| RU | 2304156 C1 | ‡ | 11/2005 | |
| RU | 2304156 C1 | | 11/2005 | |
| WO | 2009039141 A1 | | 3/2009 | |
| WO | WO-2009039141 A1 | ‡ | 3/2009 | ......... G11C 16/0483 |

OTHER PUBLICATIONS

International Searching Authority; International Search Report in International Application No. PCT/US2018/018191; dated Jun. 7, 2018; 8 pages; Moscow, Russia.‡
Titan Tool, Fine Finishing Equipment Brochure, Apr. 2016, pp. 1-24.‡
Titan Tool., Electric Airless Brochure, Apr. 2016, pp. 1-24.‡
Coating Automation Technologies, L200C Concrete Spray, date unknown, 1 page.‡
Coating Automation Technologies, Pressure Tanks, Dual Regulated, Bottom Outlet, Pressure Cups, Mixers, date unknown, 8 pages.‡
Graco Inc., Electric Sprayers Brochure, 2014, pp. 1-31.‡
Graco Inc., The Basics of Airless Spraying Brochure, 2016, pp. 1-45.‡
Titan Tool, Gas and Convertible Airless Brochure, Mar. 2016, pp. 1-24.‡
Graco Inc., Gas Airless Sprayers Brochure, 2015, pp. 1-39.‡
Graco Inc., Fine Finish Sprayers Brochure, 2015, pp. 1-23.‡

\* cited by examiner
‡ imported from a related application

*Primary Examiner* — Anthony J Green
(74) *Attorney, Agent, or Firm* — Price Heneveld LLP

(57) ABSTRACT

A system for forming a coating on a substrate is provided. The system includes a first mix having a cement, a filler, a defoamer, a cement retarder, a dispersing agent, or any combination thereof. The system additionally includes a second mix having a fatty acid derivative, a synthetic resin, one or more organosilicon compounds, a pigment, a thickener, or any combination thereof. A coating composition is formed by mixing the first and second mix together. Lastly, the system includes a spraying apparatus that applies a wet film to the substrate wherein the cured coating does not yield to wet-rubs and does not stain (effloresce) with cold distilled water.

13 Claims, 6 Drawing Sheets

|  | Comparative Example 1 | Comparative Example 2 | Example 1 | Example 2 | Example 3 | Example 4 | Example 5 |
|---|---|---|---|---|---|---|---|
| Portland Type I Cement | 13.34% | 26.58% | 21.60% | 24.05% | 15.64% | 9.16% | 3.82% |
| Recycled Glass | 50.70% | --- | 32.40% | 24.05% | 12.08% | 9.16% | 3.82% |
| Calcium Carbonate | --- | --- | --- | 4.81% | 1.90% | --- | --- |
| Talc | --- | --- | --- | --- | --- | 1.36% | 1.36% |
| Precipitated Amorphous Silica | --- | --- | --- | 0.67% | 0.69% | --- | --- |
| Metakaolin | --- | --- | 2.80% | 3.13% | --- | --- | --- |
| Silica Sand | --- | 37.94% | --- | --- | 30.96% | 27.47% | 39.20% |
| Iron Oxide Pigment | --- | --- | --- | --- | 0.32% | 0.26% | 0.91% |
| Titania | --- | --- | --- | --- | 0.95% | 1.36% | 3.82% |
| Defoamer | --- | --- | --- | --- | 0.25% | 0.04% | 0.06% |
| Wetting/Dispersing Agent | 0.02% | --- | --- | --- | --- | 0.14% | 0.14% |
| Polymeric Thickener | 0.01% | --- | --- | --- | --- | 0.06% | 0.06% |
| Vinyl Resin Redispersible Powder | 4.00% | --- | --- | --- | --- | --- | --- |
| Acrylic Resin Aqueous Dispersion | --- | 28.22% | 43.20% | 43.29% | 35.65% | 47.90% | 44.86% |
| Alkyl Silane | --- | --- | --- | --- | --- | 0.24% | 0.67% |
| Fatty Acid Derivative | --- | --- | --- | --- | 1.56% | 1.22% | 1.28% |
| Water | 31.93% | 7.26% | --- | --- | --- | 1.63% | --- |
|  | 100.00% | 100.00% | 100.00% | 100.00% | 100.00% | 100.00% | 100.00% |

FIG. 3

| | Double Rubs Based on ASTM D5402[1] | Water-Spot Testing (75 deg F) Based on ASTM D1308[2] |
|---|---|---|
| Comparative Example 1 | 16[b] | Discoloration/Efflorescence |
| Comparative Example 2 | >200[b] | Discoloration/Efflorescence |
| Example 1 | >200[c] | No Discoloration and No Efflorescense |
| Example 2 | >200[c] | No Discoloration and No Efflorescense |
| Example 3 | >200[c] | No Discoloration and No Efflorescense |
| Example 4 | >200[c] | No Discoloration and No Efflorescense |
| Example 5 | >200[c] | No Discoloration and No Efflorescense |

[a] - exposed substrate
[b] - pronounced discoloration
[c] - no discoloration

[1] - solvent used: cold distilled water
[2] - uncovered spot test using cold distilled water

FIG. 4

CEMENT RESIN HYBRID PAINT AND COATING

CROSS-REFERENCE TO RELATED APPLICATIONS

This application is a divisional of U.S. Pat. No. 10,647,855, issued May 12, 2020, entitled "CEMENT RESIN HYBRID PAINT AND COATING," which claims the benefit of and priority to U.S. Provisional Patent Application No. 62/479,626, filed on Mar. 31, 2017, entitled "CEMENT RESIN HYBRID PAINT AND COATING," the entire disclosures of which are both hereby incorporated herein by reference.

FIELD OF THE INVENTION

The present invention generally relates to coatings for a variety of substrates, and more specifically, a cement resin hybrid paint that may be used as a specialized coating.

BACKGROUND OF THE INVENTION

The paint and coatings industry is one of the most heavily regulated industries in the world. This global paint and coatings market is currently estimated to produce nearly 9 billion gallons with North America estimated at 1.5 billion gallons or 27.8 billion dollars. The challenges associated with this market include increased restrictions on volatile organic compounds (VOCs), expanding interest in green building standards, and current and future labor shortages within the trades.

Paints and other types of coatings are typically applied as liquids to a wide variety of substrates. Such coatings can be applied for a variety of reasons, for example, as protective coatings, decorative coatings, sealants, for insulation purposes, and/or to modify the surface characteristics of a substrate.

Typically, paints and coatings applied as liquids comprise four primary components: pigment; vehicle; additives; and solvent. Pigment is used to refer to coloring agents used for non-film forming components. Vehicle is used to refer to the materials used to form the film, for example, polymeric materials that can provide the protective and/or functional coating. Additives are used in coatings for one or more reasons including aiding in manufacturing, enhancing application characteristics, or improving the properties of the coating once it is applied. The solvent typically is a volatile material that functions as a dispersing medium for the pigment and the vehicle while serving as a carrier for transporting the solid materials onto the substrate. Once the coating has been applied, it is generally desirable to evaporate the solvent to establish the vehicle as a film. For many coatings, the removal of the solvent initiates the formation of the film as the solvent evaporates into the atmosphere. In some instances, when the carrier solvent is organic, it may be considered a volatile organic compound (VOC) that may be governed by certain environmental regulations.

Depending on the desired use, the solvent may cause a variety of issues that may be problematic to the application. For example, many coatings and paints are formed from a suspension or solution where organic solvents or carriers can create health and/or environmental issues during application. Upon evaporation of the solvent, the user may be exposed to carcinogenic materials. Aqueous carriers may also raise solvent issues with respect to maintaining compositional integrity during handling, storage, and application where aqueous carriers can exhibit greater sensitivity to environmental conditions such as weather, temperature, and humidity during their application.

Other issues found with the formulation and application of cement coatings to a wide variety of substrates concern variable factors such as: environmental conditions during application; drying time issues; coating thickness issues; application conditions; and logistical issues. Environmental conditions can relate to whether the coating is applied in a controlled interior environment or an exterior environment with various conditions. Coating thickness issues can relate to how thick the coating application needs to be in order to be effective for the intended result or application. Application conditions relate to the type of substrate the coating is applied to such as a vertical surface where the wet film may sag or wash off the given substrate. Drying time conditions can be strongly related to the weather where the coating is applied in a humid or dry environment. The logistical issues can concern such factors as: whether specialized personnel or equipment are needed for application; potential disruption of construction site processes during application; selecting and waiting for appropriate temperature/weather/environment conditions for application of the coating and setup; and in some instances a need for tenting the region to be coated in addition to using heaters for the tented region.

These and other issues are of concern when developing new cement containing coatings for use on particular substrates. Cement containing coatings that are affordable, readily available, easily applied, resistant to efflorescence, and/or durable are desired by consumers and must still be developed by producers.

SUMMARY OF THE INVENTION

According to one aspect of the present invention, a system for forming a coating on a substrate is provided. The system for forming a coating on a substrate includes a first mix having a cement, a filler, a defoamer, a cement retarder, a dispersing agent, or any combination thereof; a second mix having a fatty acid derivative, a synthetic resin, an organosilicon compound, a pigment, a thickener, or any combination thereof; and a high throughput spraying apparatus that applies, by spray coating, a coating composition to the substrate wherein the coating composition is formed by mixing the first and second mix. The coating has no visible efflorescence and no water rub failure.

According to an aspect of the present disclosure, a system for forming a cementitious coating on a substrate is provided. The system includes a first mix including a cement and a filler, wherein the filler is at least one material selected from a calcareous filler and siliceous filler, and a second mix including a synthetic resin and a fatty acid derivative. The first mix and the second mix are adapted to be combined to form a coating composition configured to be sprayed onto a substrate as a wet film configured to form a coating characterized by film integrity, as measured according to ASTM D5402, and no staining, as measured according to ASTM D1308, when applied at a wet film thickness of 20 mils or less and dried at 25° C. and 50% relative humidity.

According to another aspect of the present invention, a hybrid cementitious coating composition is provided. The hybrid cementitious coating composition includes a cement, a filler, a defoamer, a cement retarder, a dispersing agent, a fatty acid derivative, a synthetic resin, an organosilicon compound, a pigment, a thickener, or a combination thereof.

According to yet another aspect of the present invention, a method for applying a hybrid cementitious paint coating having no visible efflorescence on a substrate is provided. The method includes providing a dry mix having a cement, a filler, a defoamer, a cement retarder, a dispersing agent, or a combination thereof; providing a wet mix having a fatty acid derivative, a synthetic resin, an organosilicon compound, a pigment, a thickener, or a combination thereof; mixing the dry mix with the wet mix to form a coating composition; and spray coating the coating composition using a high throughput spraying apparatus to form a wet film on the substrate. The high throughput spraying apparatus is selected from the group consisting of a high volume low pressure (HVLP) paint sprayer, air-assisted airless, and a piston-pump airless paint sprayer.

These and other features, advantages, and objects of the present invention will be further understood and appreciated by those skilled in the art by reference to the following specification, claims, and appended drawings.

BRIEF DESCRIPTION OF THE DRAWINGS

FIG. 3 is a chart referencing a series of compositions used to distinguish samples found in the prior art and the inventive coating composition;

FIG. 4 is a chart referencing the results for an ASTM D5402 Standard Practice for Assessing the Solvent Resistance of Organic Coatings Using Solvent Rubs and an ASTM D1308 Standard Test Method for Effect of Household Chemicals on Clear and Pigmented Organic Finishes for the prior art and inventive coating compositions;

DETAILED DESCRIPTION

Figure 1:
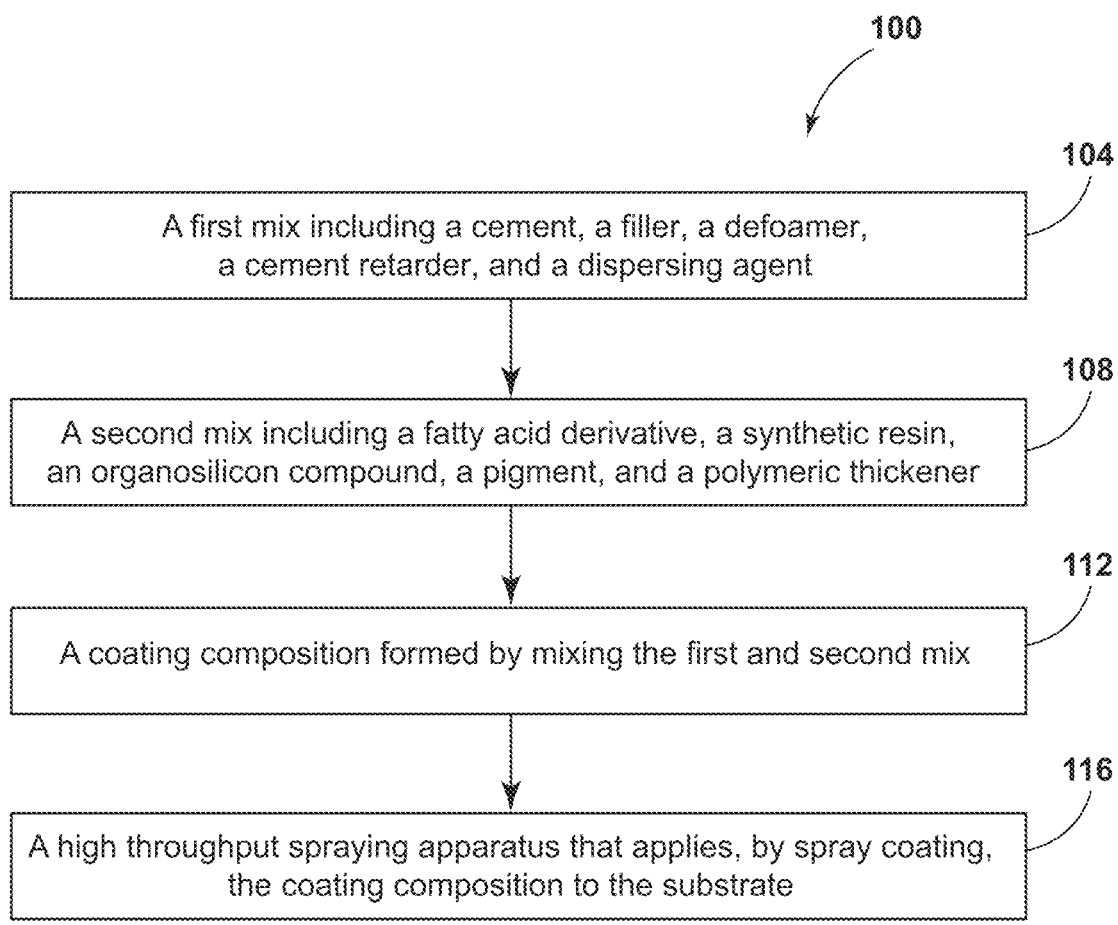
FIG. 1 is a schematic flow diagram illustrating a system for forming a coating on a substrate.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In standard cement-based paints, Portland cement serves as the principal constituent or vehicle and generally includes approximately 60%, by weight, of the composition. The cement may be blended with lime, up to 25% by weight of the composition, along with an accelerator such as calcium chloride, mineral fillers, and coloring agents to form a dry powder. When mixed with water in a given ratio by volume, the mixture forms a slurry which may be applied in two or more coats over a variety of surfaces. White cement is frequently combined with dolomite and water to form a slurry to be applied as a primer coat to fill in open pores, cracks, and the like in a surface in order to reduce the consumption of the more expensive cement paint to obtain a complete, smooth, and finished layer. Portland cement is chemically a complex mixture of several compounds, mainly calcium silicates (with some aluminates), which react with water to form calcium silicate hydrate gels that solidify to produce an inorganic polymer under typical conditions.

Sufficient water is essential to the success of the Portland cement curing process. While water loss can be a problem in a massive concrete mix, the loss of water is somewhat limited and can be readily mitigated. When a cementitious material is applied as a thin film, however, the evaporation of water will generally occur too rapidly to allow for sufficient cement hydration. In arid environments, Portland cement-based paints will not cure properly at all, and even in temperate climates, it is necessary to constantly wet the films down, for many hours after application. In spite of these difficulties, pigmented cement paints have been marketed in some countries and used as cheap decorative flat wall paints for concrete, stucco, and masonry. When properly cured, the films can be hard and even durable, although they readily allow the transmission of water and are generally used only for decorative purposes. These corresponding cement paints can be quite inflexible and do not have sufficient abrasion resistance for use on floors. When improperly cured, they show poor durability and chalk readily outside. Since conventional cement paint powders are generally coarse in texture they frequently do not adhere well to smooth plastered surfaces and consequently require an application of a liquid cement primer to obtain proper adhesion or bonding on a smooth substrate.

A plurality of hybrid cementitious paint materials are disclosed herein that have about 50.00 weight % or less cement. These cementitious paint materials are considered hybrid in that they combine cement and one or more synthetic resins, using a lower weight percent cement as compared to other cementitious paint materials currently available on the market. In addition, these hybrid paints cure quickly to give robust and durable films/coatings which suffer neither discoloration nor coating failure when subjected to solvent rubs and have no visible efflorescence (water staining). The term "water rub" as used herein, is defined to refer to ASTM D5402 Standard Practice for Assessing the Solvent Resistance of Organic Coatings Using Solvent Rubs as they cure, where distilled water is the solvent. This ASTM D5402 test is employed to indicate the degree of coating cure. The term "efflorescence" as used herein, is defined to refer to ASTM D1308 Standard Test Method for Effect of Household Chemicals on Clear and Pigmented Organic Finishes as they cure, where distilled water is the solvent. This ASTM D1308 test is employed to indicate the degree of staining of the coating.

Referring to FIGS. 1-7, a system for forming a coating on a substrate is provided. The system includes a first mix 104 having a cement, a filler, a defoamer, a cement retarder, a dispersing agent, or any combination thereof. The system additionally includes a second mix 108 having a fatty acid derivative, a synthetic resin, an organosilicon compound, a pigment, a thickener, or any combination thereof. Lastly, the system includes a high throughput spraying apparatus 116 that applies, by spray coating, a wet film to the substrate by mixing the first and second mix 104, 108 to form a coating composition 112 wherein the film has no visible efflorescence and no water rub failure.

Referring now to FIG. 1, a schematic flow diagram illustrating the system 100 for forming the coating on the substrate is provided. The first mix 104 includes the cement, the filler, the defoamer, the cement retarder, and the dispersing agent. The second mix 108 includes the fatty acid derivative, the synthetic resin, the organosilicon compound, the pigment, and the thickener. The coating composition 112 is formed by mixing the first mix 104 and the second mix 108. The high throughput spraying apparatus 116 applies, by spray coating, the coating composition 112 to the substrate. The coating composition 112 forms a wet film on the substrate after the spray application where the wet film will cure and/or dry to form the coating on the substrate.

A. First Mix

The cement and other components of the first mix 104 may be combined in a fine particulate (fine particle or powder) form. In some embodiments, the first mix 104 is a dry mix where the cement, filler, defoamer, cement retarder, and dispersing agent components can be provided together in a solid or powdered form. The first mix 104 is then added as a solid to the second mix 108 to form the coating composition 112, or as a dry material to be dispersed in an aqueous liquid carrier of the second mix 108. However, in other embodiments, the first mix 104 may be suspended in a non-aqueous carrier fluid in order to rapidly distribute it with the second mix 108 to form the coating composition 112. Typically, when a liquid carrier is used for the first mix 104, the liquid carrier is chosen from non-aqueous materials that are either water miscible or water-soluble to prevent cement curing.

The cement of the first mix 104 acts as a hydraulic binder that may include, for example, a white or gray Portland cement in conformance with ASTM C150, C595, C1157 or EN 197-1, a calcium aluminate cement in conformance with BS EN 14647 or BS 915-2, calcium sulphoaluminate cement or blends of Portland cement and one or more of calcium aluminate or calcium sulphoaluminate cement. In some embodiments, the cement of the first mix 104 may include about 2.50 weight % to about 50.00 weight %, about 8.00 weight % to about 20.00 weight %, or about 8.00 weight % to about 16.00 weight % of the coating composition 112.

The filler from the first mix 104 may include fine silica sand, quartz, talc, recycled glass, volcanic ash, perlite, fly ash, blast-furnace slag, e-glass, metakaolin, calcium carbonate in the various forms found in the industry (i.e., ground calcium carbonate, marble, calcite, limestone, and precipitated calcium carbonate), combinations thereof, and/or other fillers known to one skilled in the art. In some embodiments, the filler may be calcareous and/or siliceous particles having an average particle size less than about 425 microns. In some embodiments, the filler of the first mix 104 may include about 2.50 weight % to about 50.00 weight %, about 25.00 weight % to about 48.00 weight %, or about 36.00 weight % to about 46.00 weight % of the coating composition 112. In some embodiments, the filler may alternatively or additionally be used in the second mix 108.

The defoamer of the first mix 104 may include any suitable defoamer known in the art, for example, a mixture of mineral oil and nonionic surfactants either as a liquid product or as a powder product on an inert carrier, a defoamer based on fatty alcohol alkoxylates and polysiloxanes either as a liquid or as a powder on an inorganic carrier material or mixtures thereof. In some embodiments, defoamer products may be diluted to various degrees such that their neat dosage can be orders of magnitude higher to achieve the desired defoamer actives. When referring to the defoamer dosages disclosed in the embodiments herein, the defoamer dosages are based upon defoamer actives. In some embodiments, the defoamer of the first mix 104 may include about 0.001 weight % to about 5.00 weight %, about 0.001 weight % to about 2.50 weight %, about 0.001 weight % to about 1.00 weight %, about 0.01 weight % to about 0.50 weight %, or about 0.001 weight % to about 0.50 weight % of the coating composition 112. In some embodiments, the defoamer may alternatively or additionally be used in the second mix 108.

The cement retarder of the first mix 104 may include citric acid and tartaric acid and their salts, gluconic acid and its salts, anionic and/or nonionic surfactants, zinc oxide, and/or other cement retarders known to one skilled in the art. In some embodiments, the cement retarder of the first mix 104 may include about 0.01 weight % to about 5.00 weight %, about 0.01 weight % to about 2.50 weight %, about 0.01 weight % to about 1.00 weight %, or about 0.01 weight % to about 0.50 weight % of the coating composition 112. In some embodiments, the cement retarder may alternatively or additionally be used in the second mix 108.

The dispersing agent of the first mix 104 may include salts of naphthalene sulphonic acid formaldehyde condensates, salts of melamine sulphonic acid formaldehyde condensates, salts of lignosulphonic acid formaldehyde condensates, polycarboxylic acid, polysaccharides, polycarboxylate ethers, anionic surfactants, nonionic surfactants, and/or other dispersing agents known to one skilled in the art. In some embodiments, the dispersing agent of the first mix 104 may include about 0.01 weight % to about 2.50 weight %, about 0.01 weight % to about 1.50 weight %, or about 0.01 weight % to about 1.00 weight % of the coating composition 112. In some embodiments, the dispersing agent may alternatively or additionally be used in the second mix 108.

B. Second Mix

The components of the second mix 108 may be combined together with water to form a wet mix in a liquid form. In some embodiments, the fatty acid derivative, synthetic resin, organosilicon compound, pigment, and thickener components of the second mix 108 or wet mix are provided together in a liquid form. The first mix 104 can be added as a solid to the second mix 108 to form the coating composition 112 where the coating composition 112 is a liquid. In some embodiments, the water of the second mix 108 may include about 1.00 weight % to about 35.00 weight %, about 2.50 weight % to about 25.00 weight %, or about 2.50 weight % to about 15.00 weight % of the coating composition 112. The resultant coating composition 112 retains free water which is made available for hydration of the cement and is self-priming even over smooth surfaces.

The fatty acid derivative of the second mix 108 may include carboxylic acid groups coupled to short chains (2-6 carbons), medium chains (6-12 carbons), long chains (13-21 carbons), and/or very long chains (more than 21 carbons). In some embodiments, some non-limiting examples of fatty acid derivatives may include oleic acid, and/or stearic acid, and/or their salts such as calcium stearate, magnesium stearate, aluminum stearate, and zinc stearate. In some embodiments, the fatty acid derivative of the second mix 108 may include about 0.01 weight % to about 10.00 weight %, about 0.01 weight % to about 7.50 weight %, about 0.01 weight % to about 5.00 weight %, or about 1.00 weight % to about 5.00 weight % of the coating composition 112. In some embodiments, the fatty acid derivative may alternatively or additionally be used in the first mix 104.

The synthetic resin dispersion or redispersible powder of the second mix 108 may include, for example, acrylic co- and terpolymers, vinyl acetate co- and terpolymers including ethylene, vinyl versatate, 2-ethylhexylacrylate, di-butyl maleate, vinyl chloride, epoxy resins, polyurethane dispersions, latex, and/or other synthetic resins known to one skilled in the art. The resin dispersions disclosed herein may vary in their solids content and adjustments for these resin solids can be made and appreciated by those skilled in the art. In some embodiments, the synthetic resin of the second mix 108 may include about 5.00 weight % to about 75.00 weight %, about 10.00 weight % to about 50.00 weight %, or about 35.00 weight % to about 50.00 weight % of the coating composition 112. In some embodiments, the synthetic resin dispersion or redispersible powder may alternatively or additionally be used in the first mix 104.

The organosilicon compound of the second mix 108 may include siloxanes, polysiloxanes, and one or more short chain (2-6 carbons), medium chain (6-12 carbons), long chain (13-21 carbons), and/or very long chain (more than 21 carbons) alkyl or alkoxy silanes or combinations thereof. For example, in some embodiments, the organosilicon compound may include glycidoxypropylmethyldiethoxysilane, n-octyl triethoxy silane, amino-functional silanes, vinyl-functional silanes, and/or polyorganosiloxanes including methyl, ethyl, propyl, cyclohexyl, and/or phenyl groups. The liquid and powder organosilicon products commercially available to provide the organosilicon compound can vary in their percentage of organosilicon actives or relative amount of the actual organosilicon compound. In the examples and embodiments provided herein, the weight percents are based on the relative amount of organosilicon actives. In some embodiments, the glycidoxypropylmethyldiethoxysilane and n-octyl triethoxy silanes are used in combination at a respective ratio of 3:1, 2:1, or 1:1. In some embodiments, the organosilicon compound of the second mix 108 may include about 0.01 weight % to about 10.00 weight %, about 0.01 weight % to about 5.00 weight %, or about 0.10 weight % to about 0.50 weight % of the coating composition 112. In some embodiments, the organosilicon compound may alternatively or additionally be used in the first mix 104.

The thickener of the second mix 108 may include one or more of the following: clays, including, for example, palygorskite, sepiolite, sodium or sodium exchanged montmorillonite, hectorite and/or organoclay; cellulose derivatives including, for example, methyl cellulose, carboxymethyl cellulose, methyl hydroxyethyl cellulose, methyl hydroxypropyl cellulose, hydroxyethyl cellulose; hydroxypropyl cellulose, starch ethers; galactomannans including, for example, hydroxypropyl guar and carboxymethylhydroxypropyl guar; microbial polysaccharides such as xanthan gum, welan gum, diutan gum, and succinoglycan, carboxylated acrylic copolymer, and/or other thickeners/polymeric thickeners known to one skilled in the art. Commercially available thickeners frequently come with the thickener predispersed in a continuous phase, e.g. water, so the examples provided herein are based on the respective weight of the thickener actives or actual thickener compounds. In some embodiments, the thickener of the second mix 108 may include about 0.001 weight % to about 2.50 weight %, about 0.001 weight % to about 1.00 weight %, or about 0.001 weight % to about 0.50 weight % of the coating composition 112. In some embodiments, the thickener may alternatively or additionally be used in the first mix 104.

The pigment of the second mix 108 may include pigment additives known in the art. For example, in some embodiments, the pigment may include color pigment additives including natural or synthetic iron oxides, cobalt aluminate, titanium dioxide, and carbon black pigments. Commercially available pigments frequently come with the pigment dispersed in a continuous phase, e.g. water, so the examples provided herein are based on the respective weight of the pigment actives or actual pigment compounds. In some embodiments, the pigment of the second mix 108 may include about 0.01 weight % to about 5.00 weight %, about 0.01 weight % to about 2.00 weight %, or about 1.0 weight % to about 2.00 weight % of the coating composition 112. In some embodiments, the pigment may alternatively or additionally be used in the first mix 104.

In some embodiments, a biocide agent or compound may be added to the first mix 104 and/or the second mix 108 to help stop or reduce the negative effects caused due to microbial activities. The biocide of the first mix 104 and/or the second mix 108 may include 1,2-benzisothiazol-3(2H)-one (BIT), ortho-phenyl phenol (OPP), alkylisothiazolinones such as octylisothiazolinone (OIT), 3-iodo-2-propynyl-butylcarbamate (IPBC), carbendazim (2-benzimidazolecarbamic acid, methyl ester), chlorothalonil (1,3-dicyanotetrachlorobenzene), diuron (1,1-dimethyl-3-(3,4-dichlorophenyl)urea), azole-based antimicrobials such as tebuconazole (α-[2-(4-chlorophenyl)-ethyl]-α-(1,1-dimethylethyl)-1H-1,2,4-triazole-1-ethanol), propiconazole (1-[[2-(2,4-dichlorophenyl)-4-propyl-1,3-dioxolan-2-yl]methyl]-1H-1,2,4-triazole), and azaconazole (1-[[2-(2,4-dichlorophenyl)-1,3-dioxolan-2-yl]methyl]-1H-1,2,4-triazole), thiabendazole (2-(1,3-thiazol-4-yl)-1H-benzimidazole; 2-(4'-thiazolyl)benzimidazole), zinc pyrithione, diiodomethyl-para-tolylsulfone, 2-(thiocyanomethylthio)benzthiazole, zinc dimethyldithiocarbamate, triclosan (2',4',4-trichloro-2-hydroxydiphenyl ether), cybutrin (2-(tert-butylamino)-4-(cyclopropylamino)-6-(methylthio)-1,3,5-triazine), terbutryn (2-ethylamino-4-methylthio-6-tert-butylamino-1,3,5-triazine), N-alkyl-substituted BIT such as N-butyl-BIT, dihalo-substituted alkylisothiazolinones such as dichlorooctylisothiazolinone (DCOIT), and mixtures of two or more thereof. In some embodiments, the biocide agent of the first mix 104 and/or second mix 108 may include about 0.01 weight % to about 5.0 weight %, about 0.01 weight % to about 2.5 weight %, about 0.05 weight % to about 2.5 weight %, and about 0.05 weight % to about 1.0 weight %.

C. Coating Composition

The hybrid cementitious paint materials includes both the dry mix/first mix 104 including the cement, the filler, the defoamer, the cement retarder, and the dispersing agent used in combination with the second mix 108 including the fatty acid derivative, the synthetic resin, the organosilicon compound, the pigment, and the thickener. The coating composition 112 (also referred to as the hybrid cementitious paint material) is formed by combining/mixing the first mix 104 and the second mix 108. Although the first mix 104 and second mix 108 are defined and described in detail above, several of the components included in the first and second mixes 104, 108, as noted above, may be used in either or both mixes. In some aspects, some of the listed components may be used in both the first and second mixes 104, 108. The final cementitious paint coating products expected to be made commercially available are the separately packaged first and second mixes 104, 108 in order to achieve longer shelf lives. In some embodiments, the coating composition 112 may be pre-mixed and also made commercially available to consumers.

In some embodiments, the coating composition 112 includes the cement, the filler, the defoamer, the cement retarder, the dispersing agent, the fatty acid derivative, the synthetic resin, the organosilicon compound, the pigment, and the thickener. In some embodiments, the coating composition 112 includes 8.0-20.0 weight % cement, 25.0-48.0 weight % fillers, 1.0-3.0 pigment, 0.5-3.0 weight % dispersing agent/cement retarder, 0.01-1.00 weight % defoamer, 0.01-1.00 weight % thickener, 10.0-50.0 weight % synthetic resin, 0.01-5.00 weight % organosilicon compound, 0.5-5.0 weight % fatty acid derivative, 0.05-2.50 weight % biocide, and 1.0-10.0 weight % water.

In other embodiments, the coating composition 112 includes 8.0-10.0 weight % cement, 8-10 weight % recycled glass (filler), 1.0-3.0 weight % talc (filler), 25.0 to 30.0 weight % silica sand (filler), 1.0-3.0 weight % iron oxide pigment (pigment), 3.0-5.0 weight % titania (pigment), 0.50-3.00 weight % wetting/dispersing agent (dispersing agent and cement retarder), 0.01-0.25 weight % defoamer, 0.01-0.25 weight % thickener, 40.0-45.0 weight % acrylic resin aqueous dispersion (synthetic resin), 1.0-3.0 weight % organosilicon compound, 0.75-3.0 weight % fatty acid derivative, 0.05-1.0 weight % biocide, and 1.0-6.0 weight % water.

The wet film formed by the application of the coating composition 112 to the substrate eventually dries and forms the dried cementitious coating. The ability of these hybrid cementitious paints to cure quickly and form robust films/coatings that can withstand the "water rub" and "efflorescence" tests are at least partly due to the ratio of selective synthetic resin/polymer to cement. In some embodiments, the weight ratio of synthetic resin solids to cement can be from 0.7 to 6.0, can be from 0.9 to 6.0, or 1.0 to 3.0. In some embodiments, the ability of these hybrid cementitious paints to cure quickly and form robust films/coatings that can withstand the "water rub" and "efflorescence" tests are at least partly due to the ratio of selective fatty acid derivative to cement. In some embodiments, the weight ratio of fatty acid to cement can be from 0.01 to 1.0, can be from 0.05 to 1.0, or from 0.1 to 1.0.

For many latex paints, the small, spherical deformable particles of latex approach each other until there is just enough water left to fill in the interstices between closely packed adjacent particles. The resultant capillary forces tend to press these polymer particles together, and, if the ambient temperature is greater than the glass transition temperature ($T_g$) of the polymer, the particles coalesce (fuse or merge into one another) to form a film. If the ambient and surface temperatures are below the $T_g$ of the polymer, the latex particles will be too hard to deform and merge. Small amounts of high boiling solvents known as coalescing agents can be added during the paint preparation stage to assist in this merging process. Coalescent solvents are often employed to facilitate a harder polymer (one with a higher $T_g$ than substrate or ambient temperatures) in forming a contiguous film, where the coalescent solvent slowly evaporates over time, resulting in a film with greater hardness and improved block resistance. The reliance on evaporation as the sole means to build film integrity leaves latex paints susceptible to moisture in the substrate which can compromise the adhesion of the coating to the aforementioned substrate. For very porous substrates, block-fillers are commonly used which also rely on evaporation driven coalescence to achieve the desired integrity and as such have the same susceptibility to substrate moisture in addition to encountering difficulties in drying completely when applied thickly, hence providing a potential weakness for subsequent coating failure.

The disclosed hybrid cementitious paint coating or coating composition 112 uses a resin dispersion capable of film formation at a variety of different application temperatures without the need of a coalescent solvent that can act as a source of VOCs and substances which may have other grave health and environmental consequences. The coating formed by the coating composition 112 is able to form with a faster integrity without sacrificing a suitable pot-life time for the desired application. In addition, the coating formed will not effloresce or chalk. The resultant coating formed by the coating composition 112 can readily bond to smooth and/or porous substrates by filling voids which can eliminate the need for a separate block filler component. The hybrid cementitious paint coating, unlike traditional cement paints, can additionally provide protection against wind driven rain. The dried hybrid cementitious paint coating can readily be cleaned with a pressure washer without the delamination observed in many latex paints. The hybrid cementitious paint coating is able to continuously build integrity over time as a consequence of the cement content, resulting in a tough and durable coating.

D. Spraying Apparatus

The application of traditional cement-based paints can be labor intensive, usually being accomplished by brush or hopper sprayer, neither of which facilitate the timely completion of jobs requiring the coverage of up to several thousand square feet. The desired thicknesses used in the application of these traditional materials require longer application times and lower coverage rates per gallon. The current lack of workers in the labor force only exacerbates this lack of productivity using traditional cement-based paints.

In order to ensure formation of an effective coating for desired applications, it may be necessary to ensure that the substrate is well coated with the wet film of the coating composition 112, in spite of variations in the substrate surface, such as: cracks; rough surface material variations; joints; and/or penetrations. In many applications, to obtain a sufficiently thick wet film to ensure proper coating in view of the surface variations listed above, the coating composition 112 may often be applied as the wet film having a wet film thickness of typically at least about 5 mils, and usually about 10 mils, sometimes about 20 mils, about 30 mils, and in some instances at least 40 mils per coat, with a typical coating composition 112 thickness being from about 5 mils to about 10 mils or from about 25 mils to about 125 mils (1 mil=0.001 inch or 0.025 mm) per coat. In some embodiments, the thickness of the wet film or wet film thickness is about 100 mils or about 200 mils.

The high throughput spraying techniques described herein can be used to apply the disclosed coating compositions 112 to a very wide variety of substrates. The high throughput spraying apparatus 116 can be applied in providing coatings on substrates including, for example: masonry, cement, cement board, concrete (poured, cast, precast) wood, fiber board, plaster, plaster board (gypsum board), metal, brick, paper, plastic, rubber, glass, asphalt and various foams and foam board (for example polystyrene or polyurethane). For example, with respect to foams, the coating composition 112 can be applied to expanded polystyrene, polyurethane foam board with or without a variety of potential coatings known in the art. The substrate can be treated or untreated, for example treated or untreated wood products, plywood, oriented strand board, gypsum sheathing, or board. The substrates can also include treated materials, for example existing surfaces already having a paint coating thereon. In some embodiments, the substrate can be a metal or wood panel and/or deck. In some aspects, the substrate may include pipes, cement, concrete, mortar, glass, metal, wood, drywall, paper, plastics, brick, clay, tile, stone, granite, marble, foam, foam board, slate, terracotta, ceramics, paint, or combinations thereof.

In some embodiments, the substrate to which the coating composition 112 is applied can be vertical (for example a wall) inverted (for example, a ceiling) and/or horizontal (for example, a floor). A thick wet film may tend to distort under gravity, i.e. suffer sag, leading to distortions or irregularities in the resulting film that are unacceptable. This is exacerbated by the fact that with a water-borne coating, and relatively extended drying time, there is more opportunity for distortion, sag, or coating damage. The disclosed compositions have a non-Newtonian rheology with apparent yield stress values sufficient to reduce the likelihood of deformation due to sag.

When using relatively thick wet films, the act of drying and/or evaporating water and/or solvent from the coating composition 112 can itself raise issues. As the water and/or solvent is evaporated from the coating composition 112 or wet film, the coating can become thinner and can distort. The water and/or solvent evaporation can lead to blisters, puckering or other irregularities in the coating (film) leading to a loss of coating integrity. This issue is exacerbated with water-borne coatings, as the coating thickness is increased, since such films dry from the outside in; in addition, the trapped water needs to escape as part of the curing process. The disclosed coating compositions herein are able to scavenge the aforementioned trapped moisture internally eliminating the associated issues with water evaporation.

External to the coating composition 112, environmental conditions can be an important factor with water-borne coatings. The extensive drying times required can mean that long breaks or stops in working are necessary. Waiting for the right temperature and humidity circumstances, to provide proper and even drying (set up or cure) can create delay and expense. Unanticipated weather patterns (temperature, precipitation, humidity) can result in an undesired resultant coating or film and/or the need for multiple coating applications. The disclosed coating composition 112 is capable of accelerated drying and re-coat times even in high humidity, which would retard the evaporation induced film formation of water-borne latex coatings. In some embodiments, the coating composition 112 or wet film can dry in less than 8 hours, less than 7 hours, less than 6 hours, less than 5 hours, less than 4 hours, less than 3 hours, less than 2 hours, or less than 1 hour. In some examples, the coating composition 112 or wet film can dry in less than 6 hours.

The coating compositions 112 disclosed herein can be specifically formulated for spray applications as described herein, where the mixed coating composition 112 may remain stable for longer periods of time prior to application, when compared to the prior art.

Upon contacting or mixing the first and second mixes 104, 108, the coating composition 112 is formed. Although these first and second mixes 104, 108 could be mixed as continuous flowing streams when the coating composition 112 is applied to the substrate, the time after mixing, until application of the coating composition 112 on the substrate, is less than 3 hours. The coating composition 112 resulting from combining the first and second mixes 104, 108 will typically have an extended pot life. The term "pot life" as used herein, is defined to refer to the length of time after combination of the first and second mixes 104, 108, until the combination can no longer be effectively applied, since it has thickened too much. Typically, the pot life for the coating composition 112 will be at least 8 hours. When spray coating the coating composition 112, the pot life will be at least 1 hour, at least 2 hours, at least 3 hours, at least 4 hours, at least 5 hours, at least 6 hours, at least 7 hours, at least 8 hours, at least 9 hours, at least 10 hours, at least 11 hours, or at least 12 hours. The pot life is determined by temperature and relative humidity and can be modified with conventional set modifiers as known to those skilled in the art. In some aspects, the hybrid cementitious coating composition 112 may be stored and applied for up to 1 hour, 2 hours, 3 hours, 4 hours, 5 hours, 6 hours, 7 hours, or 8 hours using a high throughput spraying apparatus selected from the group consisting of a high volume low pressure (HVLP) paint sprayer, a piston-pump airless paint sprayer, an air-assisted airless paint sprayer, and combinations thereof. Each of these referenced high throughput spraying apparatuses are described in more detail below.

The film is applied to the substrate, by providing the coating composition 112 as the wet film (thick or thin) on the substrate and allowing the film to set up (cure). When a 2-mix approach is used as described herein, it is desired that the dry mix or first mix 104 be directly mixed with the wet mix or second mix 108 before the application occurs, so that absorption of the free water by the dry mix/first mix 104, from the wet mix/second mix 108, is initiated before the spray application occurs. This system 100 or process does not require a rapid process of intimate mixing and application but rather can be mixed and stored for the duration of the respective pot life.

Conceptually, a variety of techniques for applying the coating composition 112 as the wet film on the substrate can be used, for example, brush application, spray application, roller application, etc. The particular application approach chosen may affect the choice of mixing conditions and/or first mix 104 or second mix 108 compositions. The reason is that some applications lend themselves to very quick application after mixing while others require a more substantial pot life. In some embodiments, spray applications using the high throughput spraying apparatus 116 are used, since it can be conducted with a wide variety of time periods, and can be used to accomplish quick coatings on a large substrate. There is no specific requirement, other than management of issues concerning thickening and applicability, regarding the technique of application.

The dry film thickness of the coating will be the thickness that results after the wet film dries and the polymer resin and/or cement cures, for example after the incorporation of the free water by the cement. Typically the wet film thickness is applied adequately to the substrate to provide that the resulting dry coating is appropriate to provide the desired protective or other properties intended. In some embodiments, the application of the coating composition 112 to the substrate will yield a thickness of the resultant dried coating of at least about 2.5 mils, at least about 10.5 mils, or at least about 15 mils per coat applied. In additional embodiments, the thickness of the dried coating will be from about 5 mils to about 10 mils, about 15 mils to about 30 mils, about 10 mils to about 100 mils, or about 10 mils to about 250 mils per coat applied. The upper limit on the thickness can be increased as needed by the application, so in some embodiments the thickness could be greater than 50 mils (1.25 mm), greater than 100 mils (2.5 mm), or greater than 200 mils (5 mm).

The coating compositions 112 disclosed herein have the flexibility of not only remaining stable for extended periods of time but can also be applied to substrates at a variety of temperatures. In some embodiments, the coating composition 112 can be applied under ambient conditions at about 104° F. (40° C.). In other embodiments, the coating composition 112 can be applied at colder temperatures such as about 50° F. (10° C.). In yet other embodiments, the coating composition 112 can be applied at temperatures between about 50° F. (10° C.) and about 104° F. (40° C.), between about 60° F. (15° C.) and about 95° F. (35° C.), and between about 68° F. (20° C.) and about 86° F. (30° C.). The lower limit for this application requires that the composition be a fluid when applied. Applying these coating compositions 112 at lower temperatures or higher humidity conditions can be managed with the application of various components according to the present disclosure.

Handheld sprayers can utilize airless technology. A professional piston-pump design in a handheld sprayer gives painting contractors and consumers the freedom to spray wherever they want with true airless performance. These handheld sprayers can be operated by electric or battery power sources and are designed for small jobs and touchup work (1-3 gallons). The advantages of handheld sprayers are the professional spray finish, ultimate portability on the job, and quick setup/cleanup compared to using a larger airless sprayer for small jobs. Startup, spray, and cleanup can be done in minutes. The handheld sprayers are similar to a traditional airless sprayer where they have a gun and pump built into the sprayer. The only major difference is that a handheld sprayer does not have an airless hose, making it easier to start up. Without an airless hose, the handheld sprayer wastes less material and is also easy to clean for small jobs. There are several categories of handheld sprayers that are designed to spray specific materials.

There are two general types of pumps offered in the airless sprayer market: diaphragm and piston. The advantages of a piston pump are: pumps higher-viscosity coatings with ease, provides higher pressure at common tip sizes, better atomization, allows the use of longer hoses, better withstands hard use, lower maintenance costs, easy to repair, primes easier, and runs only on demand. In some embodiments, a 2-ball piston pump may be employed to spray the cementitious coatings described herein. In embodiments when high volume low pressure (HVLP) spray equipment is being used, the coating composition 112 is better applied to the substrate using a pressure pot rather than by being gravity fed.

Equipment and techniques now known or developed in the future can be used for the mixing and the application of the coating composition 112 as a spray. Equipment manufacturers and/or suppliers that can be used are, for example, Coating Atomization Technologies, Louisville, Colo. 80027; GRACO, Inc., Minneapolis, Minn. 55413; and Titan Tool, Plymouth, Minn. 55447. The equipment can be enhanced or modified for performance, depending upon the specific application intended.

Some non-limiting examples of HVLP sprayers are the C.A. Technologies Lynx 100H, Panther 100H, and L200C. Representative properties of HVLP systems used to apply the coating composition 112 include the HVLP having a fluid nozzle tip equal to or greater than 0.067-inch (1.7 mm) while in some embodiments the fluid nozzle tip is 0.110-inch (2.8 mm). The HVLP systems may additionally include a pressure pot rated to a minimum of 50 psi (0.3447 MPa) with an adjustable pot pressure and/or an adjustable gun inlet pressure. In other embodiments, some non-limiting examples of airless sprayers are handheld piston pump sprayers such as the Graco X-Force HD, and full size piston pump sprayers such as the Graco Ultra Max II 695, the Graco GMAX II 7900, or the Graco Mark V, gas hydraulic airless sprayers such as GH130, GH200, and GH230 available from Graco, Inc. of Minneapolis, Minn. Such equipment has the ability to deliver the coating composition 112 to a spray-gun at a pressure sufficient to atomize the liquid through an airless pumping system, and ultimately, to the substrate. Representative properties of airless spraying systems used to apply the coating composition 112 include having a maximum flow rate of greater than or equal to 0.9 gallons per minute (3.407 liter per minute). The airless sprayers may include the ability to support spray tips of "0.017-inch (0.4318 mm) or larger and/or "0.021-inch (0.5334 mm) or larger and an operating pressure range of greater than or equal to 2000 psi (13.79 MPa). Air-assisted airless sprayers combine an airless pump with pressurized air to effect atomization and fan control at the tip. Some non-limiting examples of air-assisted airless sprayers include the Graco FinishPro II 395 PC and FinishPro II 595. Representative properties of air-assisted airless sprayers include the ability to support spray tips of 0.017-inch (0.4318 mm) or larger and/or 0.021-inch (0.5334 mm) or larger. Gas hydraulic, gas, and/or electric sprayers may additionally be used as high throughput spraying apparatus as long as they are able to apply the coating composition 112 without becoming clogged. The application of the coating composition 112 using the piston pump airless sprayer system as described herein rapidly, effectively, and evenly applied the wet film where the application did not lead to cleaning issues or depositions in the pump manifold, fluid lines, and/or spray gun assembly. As noted herein, piston pump airless sprayers and the other spraying apparatuses disclosed herein are capable of applying a desirable wet film of the coating composition 112 in an efficient commercial application where application speed, drying times, application times, evenness of the applied wet films, and reuse of high throughput sprayer devices are desired.

In some embodiments, the high throughput spraying devices mentioned herein, including the hvlp sprayer, the piston-pump airless sprayer and air-assisted airless sprayer, may have a maximum flow rate of greater than or equal to 0.1 gallons per minute (gpm), greater than or equal to 0.25 gpm, greater than or equal to 0.5 gpm, greater than or equal to 0.75 gpm, greater than or equal to 1.0 gpm, or greater than or equal to 1.25 gpm.

In a typical static mixer, two separate streams are brought together in the mixer spray head, and are mixed with continuous streaming, as the spraying occurs. The intimate mixing that occurs in the spray head or equipment, combined with a rapid rate at which evacuation of the mixture from the spray head occurs, can provide for desirable effects depending on the applied composition and application. Although the embodiments disclosed herein could potentially be used with a static mixer, the coating compositions 112 are designed to be mixed before spray application and then applied using the high throughput spraying apparatus.

Figure 2:
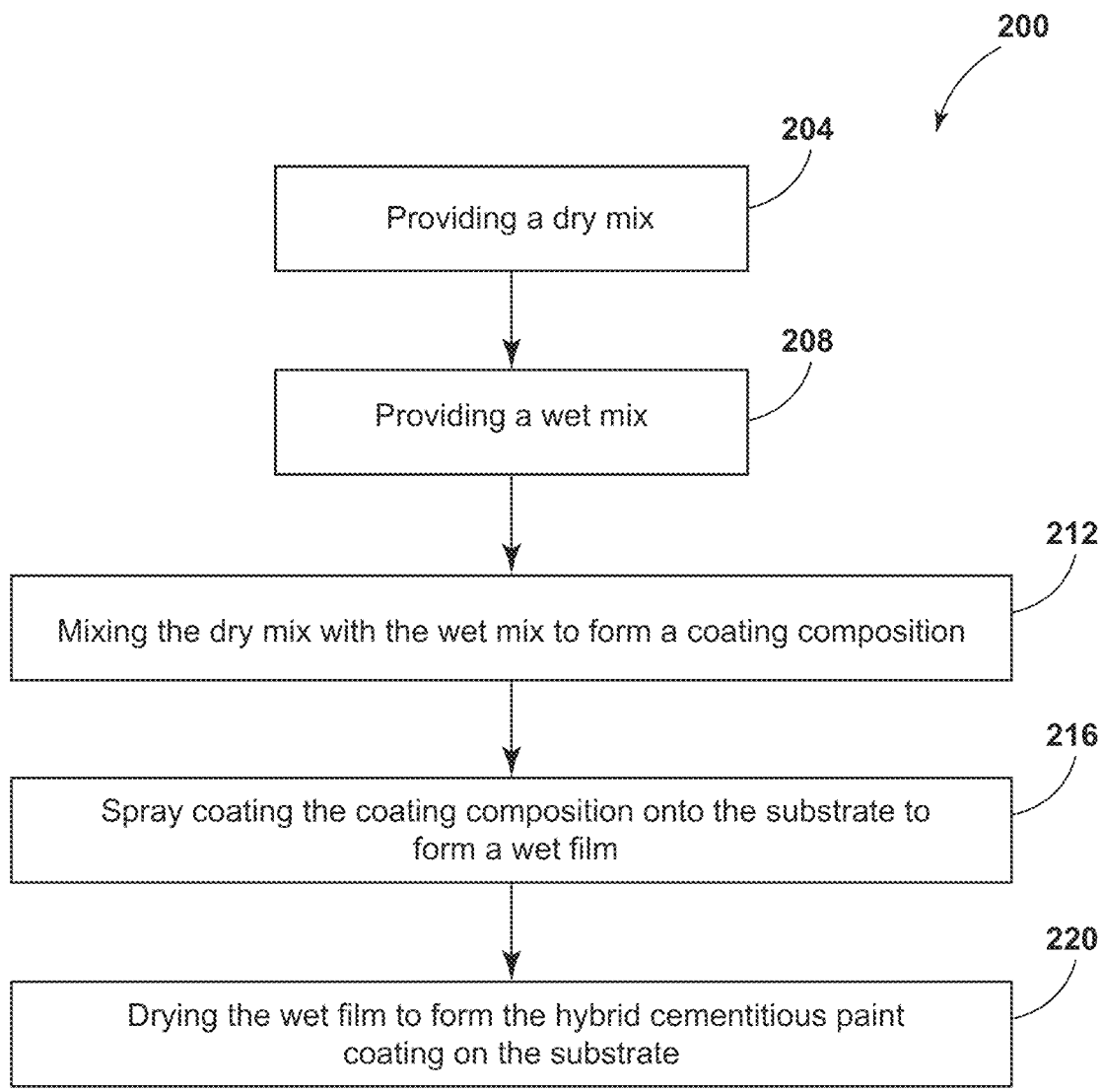
FIG. 2 is a schematic flow diagram illustrating a method for applying a hybrid cementitious paint material to a substrate.
Figure 5:
FIG. 5 is a reference picture of a sample that failed the ASTM D5402 Standard Practice for Assessing the Solvent Resistance of Organic Coatings Using Solvent Rubs.
Figure 6:
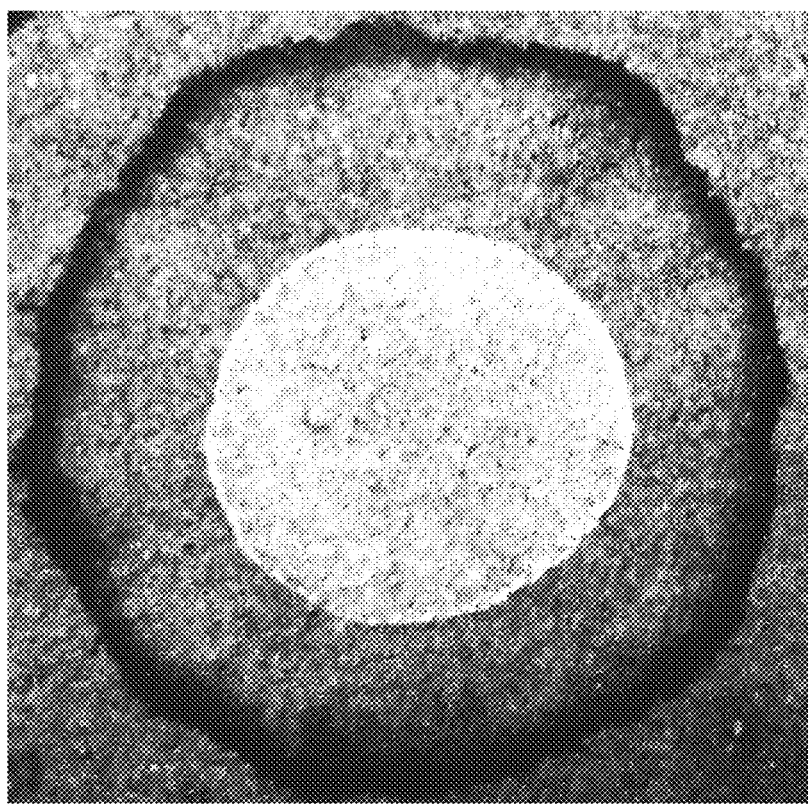
FIG. 6 is a reference picture of a sample that failed the ASTM D1308 Standard Test Method for Effect of Household Chemicals on Clear and Pigmented Organic Finishes.
Figure 7:
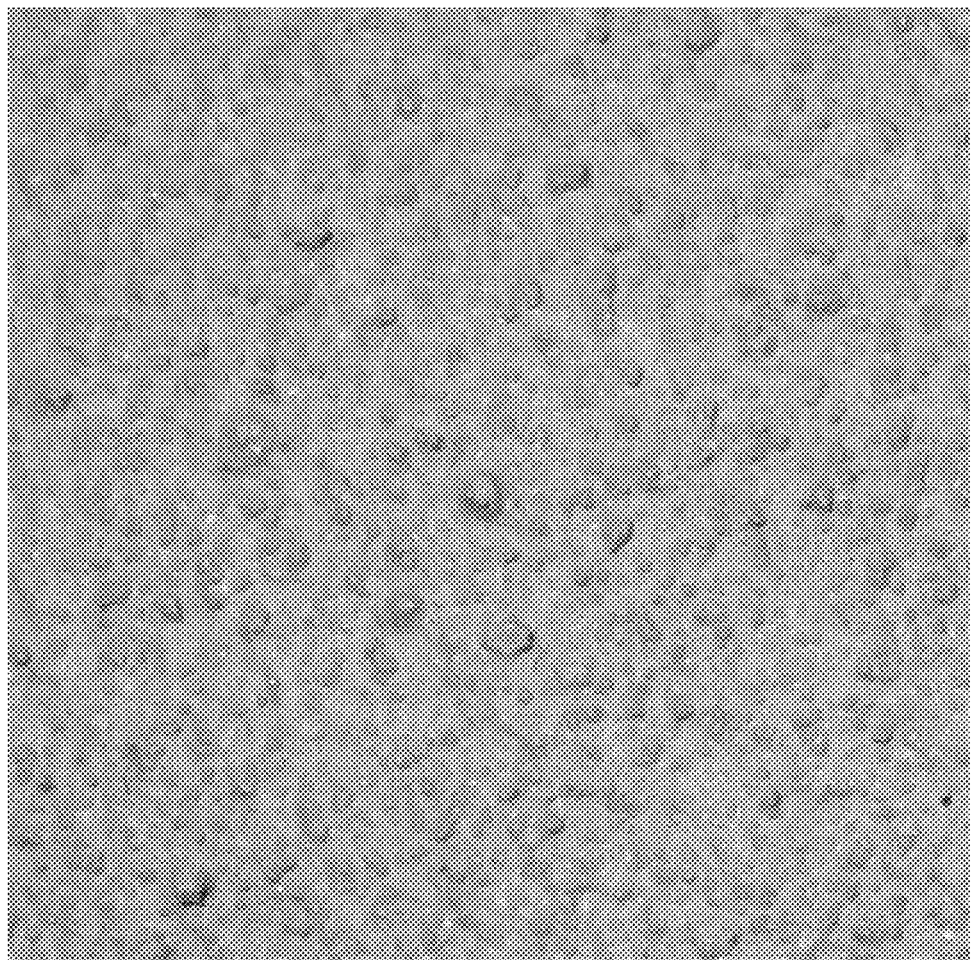
FIG. 7 is a reference picture of a sample that passed both the ASTM D5402 Standard Practice for Assessing the Solvent Resistance of Organic Coatings Using Solvent Rubs and the ASTM D1308 Standard Test Method for Effect of Household Chemicals on Clear and Pigmented Organic Finishes.

Referring now to FIG. 2, a method 200 for applying the hybrid cementitious paint coating having no visible efflorescence on the substrate is provided. The method 200 includes providing the first or dry mix 104 including the cement, the filler, the defoamer, the cement retarder, and the dispersing agent (step 204). The method 200 also includes providing the second or wet mix 108 comprising the fatty acid derivative, the synthetic resin, the organosilicon compound, the pigment, and the thickener (step 208). The dry mix can then be combined or mixed with the wet mix to form the coating composition 112 (step 212). The coating composition 112 can be spray coated using a high throughput spraying apparatus to form a wet film on the substrate (step 216). The high throughput spraying apparatus is selected from the group consisting of a high volume low pressure (HVLP) paint sprayer, an air-assisted airless sprayer, and/or a piston-pump airless paint sprayer. The wet film is then dried to form the hybrid cementitious paint coating on the substrate (step 220).

It is understood that the descriptions outlining and teaching the system for forming a coating on the substrate previously discussed, which can be used in any combination, apply equally well to the method 200, where applicable, further disclosing the application of the hybrid cementitious paint coating having no visible efflorescence on the substrate.

The development of this inventive hybrid cementitious coating and its ability to be spray coated reduces the labor required to prepare and apply the coating, reduces the amount of material (coating composition 112) needed to complete a project, reduces the VOC content while providing a tough and durable finish. This inventive hybrid cementitious coating provides a sprayable architectural cement and resin coating composition 112 that forms films that deliver a tougher, stronger, more durable finish for concrete, block, and brick surfaces laden with features including: low VOC while potentially contributing toward LEED certification, UV resistance and color stability based on iron oxide pigments, post-consumer glass content providing green characteristics, self-primer, efflorescence control, breathable finish allowing building to breath, wind driven results exceeding industry standards, unique textural finish, and the ability to coat new concrete faster than traditionally known and used paints and coatings.

It will be understood by one having ordinary skill in the art that construction of the described device and other components may not be limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature or may be removable or releasable in nature unless otherwise stated.

It is also important to note that the construction and arrangement of the elements of the spray devices as described herein are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

LISTING OF NON-LIMITING EMBODIMENTS

Embodiment A is a system for forming a cementitious coating on a substrate. The system of Embodiment A includes a first mix comprising a cement, a filler, a defoamer, a cement retarder, and a dispersing agent, a second mix comprising a fatty acid derivative, a synthetic resin, an organosilicon compound, a pigment, and a thickener, and a high throughput spraying apparatus that applies, by spray coating, a coating composition to the substrate wherein the coating composition is formed by mixing the first and second mix. The coating has no visible efflorescence and no water rub failure The system of Embodiment A wherein the substrate comprises pipes, cement, concrete, mortar, glass, metal, wood, drywall, paper, plastics, brick, clay, tile, stone, granite, marble, foam, foam board, slate, terracotta, ceramics, paint, or combinations thereof.

The system of Embodiment A or Embodiment A with any of the intervening features wherein the high throughput spraying apparatus comprises a high volume low pressure (HVLP) paint sprayer.

The system of Embodiment A or Embodiment A with any of the intervening features wherein the high throughout spraying apparatus comprises an air-assisted airless paint sprayer.

The system of Embodiment A or Embodiment A with any of the intervening features wherein the high throughput spraying apparatus comprises a piston-pump airless paint sprayer.

The system of Embodiment A or Embodiment A with any of the intervening features wherein the first mix comprises 2.50 weight % to 50.00 weight % cement, 25.00 weight % to 50.00 weight % filler, 0.01 weight % to 0.50 weight % defoamer, 0.01 weight % to 0.50 weight % cement retarder, and 0.01 weight % to 1.00 weight % dispersing agent of the coating composition.

The system of Embodiment A or Embodiment A with any of the intervening features wherein the second mix comprises 0.05 weight % to 5.00 weight % fatty acid derivative, 20.0 weight % to 50.0 weight % synthetic resin, 0.01 weight % to 5.00 weight % organosilicon compound, 0.01 weight % to 2.00 weight % pigment, and 0.01 weight % to 0.50 weight % thickener of the coating composition.

The system of Embodiment A or Embodiment A with any of the intervening features wherein the filler comprises recycled glass, calcium carbonate, talc, precipitated amorphous silica, silica sand, or a combination thereof.

Embodiment B is a hybrid cementitious coating composition including a cement, a filler, a defoamer, a cement retarder, a dispersing agent, a fatty acid derivative, a synthetic resin, an organosilicon compound, a pigment, and a thickener.

The material of Embodiment B wherein the coating composition comprises 2.50 weight % to 50.00 weight % cement, 25.0 weight % to 50.00 weight % filler, 0.01 weight % to 0.50 weight % defoamer, 0.01 weight % to 0.50 weight % cement retarder, and 0.01 weight % to 1.00 weight % dispersing agent of the coating composition.

The material of Embodiment B or Embodiment B with any of the intervening features wherein the coating composition comprises 0.05 weight % to 5.00 weight % fatty acid derivative, 20.0 weight % to 50.0 weight % synthetic resin, 0.01 weight % to 5.00 weight % organosilicon compound, 0.01 weight % to 2.00 weight % pigment, and 0.01 weight % to 0.50 weight % thickener of the coating composition.

The material of Embodiment B or Embodiment B with any of the intervening features wherein the coating composition comprises 9.0 weight % to 20.00 weight % cement, 38.0 weight % to 46.00 weight % filler, 0.01 weight % to 0.50 weight % defoamer 0.01 weight % to 0.50 weight % first thickener, 0.01 weight % to 0.50 weight % cement retarder, and 0.01 weight % to 1.00 weight % dispersing agent of the coating composition.

The material of Embodiment B or Embodiment B with any of the intervening features wherein the coating composition comprises 1.0% to 5.0% fatty acid derivative, 35.0% to 50.0% synthetic resin, 0.01% to 5.00% organosilicon compound, 0.01% to 2.00% pigment, and 0.01% to 0.20% thickener of the coating composition.

The material of Embodiment B or Embodiment B with any of the intervening features wherein the filler comprises recycled glass, calcium carbonate, talc, precipitated amorphous silica, silica sand, or a combination thereof.

The material of Embodiment B or Embodiment B with any of the intervening features wherein the hybrid cementitious coating composition is stored and applied using a high throughput spraying apparatus selected from the group consisting of a high volume low pressure (HVLP) paint sprayer, a piston-pump airless paint sprayer, an air-assisted airless paint sprayer, and combinations thereof.

The material of Embodiment B or Embodiment B with any of the intervening features wherein the hybrid cementitious coating composition is applied using a high volume low pressure (HVLP) paint sprayer for up to 8 hours.

The material of Embodiment B or Embodiment B with any of the intervening features wherein the hybrid cementitious coating composition is applied using a piston-pump airless paint sprayer for up to 8 hours.

The material of Embodiment B or Embodiment B with any of the intervening features wherein the hybrid cementitious coating composition is applied using an air-assisted airless paint sprayer for up to 8 hours.

Embodiment C is a method for applying a hybrid cementitious paint coating having no visible efflorescence on a substrate. The method includes providing a dry mix comprising a cement, a filler, a defoamer, a cement retarder, and a dispersing agent, providing a wet mix comprising a fatty acid derivative, a synthetic resin, an organosilicon compound, a pigment, and a thickener, mixing the dry mix with the wet mix to form a coating composition, and spray coating the coating composition using a high throughput spraying apparatus to form a wet film on the substrate. The high throughput spraying apparatus is selected from the group consisting of a high volume low pressure (HVLP) paint sprayer, an air-assisted airless paint sprayer, and a piston-pump airless paint sprayer.

The method of Embodiment C wherein the substrate comprises pipes, cement, concrete, mortar, glass, metal, wood, drywall, paper, plastics, brick, clay, tile, stone, granite, marble, foam, foam board, slate, terracotta, ceramics, paint, and combinations thereof.

The method of Embodiment C or Embodiment C with any of the intervening features wherein the dry mix comprises 2.50 weight % to 50.00 weight % cement, 2.50 weight % to 50.00 weight % filler, 0.01 weight % to 0.50 weight % defoamer, 0.01 weight % to 0.50 weight % cement retarder, and 0.01 weight % to 1.00 weight % dispersing agent of the coating composition.

The method of Embodiment C or Embodiment C with any of the intervening features wherein the wet mix comprises 0.05 weight % to 5.00 weight % fatty acid derivative, 10.0 weight % to 50.0 weight % synthetic resin, 0.01 weight % to 5.00 weight % organosilicon compound, 0.01 weight % to 2.00 weight % pigment, and 0.01 weight % to 0.20 weight % thickener of the coating composition.

The method of Embodiment C or Embodiment C with any of the intervening features wherein the filler comprises recycled glass, calcium carbonate, talc, precipitated amorphous silica, silica sand, or a combination thereof.

EXAMPLES

Materials

The Portland Type I cement, recycled glass, calcium carbonate, talc, precipitated amorphous silica, metakaolin, silica sand, iron oxide pigment, titania, defoamer, wetting/dispersing agent, thickener, vinyl resin redispersible powder, acrylic resin aqueous dispersion, functionalized silanes, and fatty acid derivatives were all obtained from commercial suppliers and used as provided.

Methods and Procedures

First mix (dry mix): Pre-blend dry powder components.

Second mix (wet mix): Pre-blend wet liquid components where applicable.

Surface Preparation

The coating composition 112 should be applied to a clean surface of the substrate. The surface of the substrate to be painted should be free from oil, wax, concrete curing agents and bond breakers, chalk, efflorescence, mildew, rust, product fines, dust, or any other surface contaminants that could affect the performance of the hybrid cementitious paint coating. Any loose, pealing, or cracking paint present should be removed by scraping, sanding, power washing, wire brush, electric sanders or grinders, or by whatever means deemed as necessary. Severely damaged areas may be repaired by tuck pointing and/or caulking all open seams. Glossy, rough, and patched surfaces may be sanded. Areas affected by mildew should be treated with a commercial mildew remover. New concrete and masonry should be allowed to cure/dry for at least 7 days before applying the coating composition 112.

The substrate should be tested for coating acceptability prior to application of the coating composition 112. This can be done by spraying the substrate with water. If the water soaks into the substrate, the substrate is properly prepared and can be coated when dry. If the water beads up and is repelled, the substrate may require additional cleaning prior to application of the coating.

Mixing

The coating composition 112 is a two-part mixture including the first mix 104 (dry mix) and the second mix 108 (wet mix). The first mix 104 (dry mix) and the second mix 108 (wet mix) can be combined and mixed on site. In the Comparative Examples and Examples described below, the mixer used was an EIBENSTOCK EZR 22 R R/L SET. The EIBENSTOCK "Special" mixer paddles were used with the EIBENSTOCK mixing stand. In the provided Comparative Examples and Examples, a clean and empty 5-gallon pail was filled ⅔ full of water and the pail was placed in the area of the mixing stand. The lid was removed from the wet mix and the pail containing the wet mix was placed onto the mixing stand and the mixer positioned into the pail. The mixing was started in the counterclockwise setting (dashed arrow) for the wet mix on speed A. Slowly and carefully, the dry mix was added to the wet mix over about 5 minutes. The speed was slowly increased by changing the mixer speed to setting ELF. After 1 minute, the mixer was turned off, the sides of the pail were scraped, and the pail containing the coating composition 112 was carefully rotated a half-turn (180°) and the sides were scraped again. The mixer was turned back on and gradually returned to mixer speed ELF for 2 more minutes. After the product was uniformly and completely mixed, the mixer was returned to speed A, and then stopped. The mixer was transferred from the coating composition 112 to the pail of clean water. The mixer was turned on for 10-20 seconds in clean water to remove coating composition 112 from the paddles.

Application

The Comparative Examples and Examples described below applied the coating composition 112 to the substrate where the wet film was allowed to dry at about 25° C. and 50% relative humidity. The coating composition 112 was applied using either a high volume low pressure (HVLP) sprayer or a drawdown bar to yield a wet film thickness of about 5 mils. As discussed herein, the wet film thickness can be varied using an HVLP sprayer, drawdown bar, or other techniques depending on the desired application.

ASTM Methods

ASTM D5402 Standard Practice for Assessing the Solvent Resistance of Organic Coatings Using Solvent Rubs. The solvent employed was distilled water.

ASTM D1308 Standard Test Method for Effect of Household Chemicals on Clear and Pigmented Organic Finishes. The solvent employed was cold distilled water.

Comparative Example 1

The dry mix used in Comparative Example 1 included 13.34 weight % Portland Type I Cement, 50.70 weight % recycled glass, and 4.00 weight % vinyl resin redispersible powder. The wet mix of Comparative Example 1 included 0.02 weight % wetting/dispersing agent, 0.01 weight % thickener, and 31.93 weight % water. The given weight percentages are provided with respect to the total weight of the combined coating composition.

The film produced using the coating composition of Comparative Example 1 also did not develop film integrity at 25° C. and 50% relative humidity when cured for more than 52 weeks. This deficiency is likely due to the loss of free water before sufficient curing (cement hydration) of the coating composition. As expected, reactive coatings become more resistant to solvents as they cure. ASTM D5402 was employed in this example to indicate the degree of cure. The coating made with Comparative Example 1 additionally showed staining (efflorescence) with cold distilled water. ASTM D1308 was employed to illustrate whether or not the coating was susceptible to induced efflorescence, which is of great significance when applying the coating for decorative purposes, particularly if the coating were to encounter water in the form of moisture condensation, precipitation, or incidental contact like that from irrigation.

Comparative Example 2

The dry mix used in Comparative Example 2 included 26.58 weight % Portland Type I Cement and 37.94 weight % silica sand. The wet mix of Comparative Example 2 included 28.22 weight % acrylic resin aqueous dispersion and 7.26 weight % water. The given weight percentages are provided with respect to the total weight of the combined coating composition.

This example, while not readily yielding under water rubs, when cured for 72-hours, did show discoloration. As expected, the reactive coatings become more resistant to solvents as they cure. ASTM D5402 was employed in this example to indicate the degree of cure. The coating made with Comparative Example 2 stained (effloresced) with cold distilled water. ASTM D1308 was employed to illustrate whether or not the coating was susceptible to induced efflorescence, which is of great significance when applying the coating for decorative purposes, particularly if the coating were to encounter water in the form of moisture condensation, precipitation, or incidental contact like that from irrigation.

Example 1

The dry mix used in Example 1 included 21.60 weight % Portland Type I Cement, 32.40 weight % recycled glass, and 2.80 weight % metakaolin. The wet mix of Example 1 included 43.20 weight % acrylic resin aqueous dispersion. The given weight percentages are provided with respect to the total weight of the combined coating composition 112.

The cementitious coating produced using the coating composition 112 formed from the components of Example 1 developed rapid film integrity within 24-hours. This cementitious coating maintained its integrity under the wet rub test using ASTM D5402 and did not show any signs of induced discoloration. ASTM D1308 was performed to illustrate whether this cementitious coating was susceptible to induced efflorescence but the coating did not stain with cold distilled water at ambient temperature of 25° C.

Example 2

The dry mix used in Example 2 included 24.05 weight % Portland Type I Cement, 24.05 weight % recycled glass, 4.81 weight % calcium carbonate, 0.67 weight % precipitated amorphous silica, and 3.13 weight % metakaolin. The wet mix of Example 2 included 43.29 weight % acrylic resin aqueous dispersion. The given weight percentages are provided with respect to the total weight of the combined coating composition 112.

The cementitious coating produced using the coating composition 112 made from the components of Example 2 developed rapid film integrity within 24-hours. This cementitious coating maintained its integrity under the wet rub test using ASTM D5402 and did not show any signs of induced discoloration. ASTM D1308 was performed to illustrate whether this cementitious coating was susceptible to induced efflorescence but the coating did not stain with cold distilled water at ambient temperature of 25° C.

Example 3

The dry mix used in Example 3 included 15.64 weight % Portland Type I Cement, 12.08 weight % recycled glass, 1.90 weight % calcium carbonate, 0.69 weight % precipitated amorphous silica, 30.96 weight % silica sand, 0.95 weight % titania, and 0.25 weight % defoamer. The wet mix of Example 3 included 0.32 weight % iron oxide pigment, 35.65 weight % acrylic resin aqueous dispersion, and 1.56 weight % fatty acid derivative. The given weight percentages are provided with respect to the total weight of the combined coating composition 112.

The components of Example 3 were mixed as described above to form the coating composition 112 which was then used to form the cementitious coating. The resultant cementitious coating developed rapid film integrity within 6-hours. This cementitious coating maintained its integrity under the wet rub test using ASTM D5402 and did not show any signs of induced discoloration. ASTM D1308 was performed to illustrate whether this cementitious coating was susceptible to induced efflorescence but the coating did not stain with cold distilled water at ambient temperature of 25° C.

Example 4

The dry mix used in Example 4 included 9.16 weight % Portland Type I Cement, 9.16 weight % recycled glass, 1.36 weight % talc, 27.47 weight % silica sand, 1.36 weight % titania, 0.14 weight % wetting/dispersing agent, and 0.04 weight % defoamer. The wet mix of Example 4 included 0.26 weight % iron oxide pigment, 0.06 weight % thickener, 47.90 weight % acrylic resin aqueous dispersion, 0.24 weight % alkyl silane, 1.22 weight % fatty acid derivative, and 1.63 weight % water. The given weight percentages are provided with respect to the total weight of the combined coating composition 112.

The components of Example 4 were mixed as described above to form the coating composition 112 which was then used to form the cementitious coating. The resultant cementitious coating developed rapid film integrity within 6-hours. This cementitious coating maintained its integrity under the wet rub test using ASTM D5402 and did not show any signs of induced discoloration. ASTM D1308 was performed to illustrate whether this cementitious coating was susceptible to induced efflorescence but the coating did not stain with cold distilled water at ambient temperature of 25° C.

Example 5

The dry mix used in Example 5 included 3.82 weight % Portland Type I Cement, 3.82 weight % recycled glass, 1.36 weight % talc, 39.20 weight % silica sand, 3.82 weight % titania, 0.14 weight % wetting/dispersing agent, 0.06 weight % thickener, and 0.06 weight % defoamer. The wet mix of Example 5 included 0.91 weight % iron oxide pigment, 44.86 weight % acrylic resin aqueous dispersion, 0.67 weight % alkyl silane, and 1.28 weight % fatty acid derivative. The given weight percentages are provided with respect to the total weight of the combined coating composition 112.

The components of Example 5 were mixed as described above to form the coating composition 112 which was then used to form the cementitious coating. The resultant cementitious coating developed rapid film integrity within 6-hours. This cementitious coating maintained its integrity under the wet rub test using ASTM D5402 and did not show any signs of induced discoloration. ASTM D1308 was performed to illustrate whether this cementitious coating was susceptible to induced efflorescence but the coating did not stain with cold distilled water at ambient temperature of 25° C.

The invention claimed is:

1. A system for forming a cementitious coating on a substrate, the system comprising:
    a first mix comprising a cement, a filler, a defoamer, a cement retarder, a dispersing agent wherein the first mix comprises 2.50 wt % to 50.00 wt % cement, 25.00 wt % to 50.00 wt % filler, 0.01 wt % to 0.50 wt % defoamer, 0.01 wt % to 0.50 wt % cement retarder, and 0.01 wt % to 1.00 wt % dispersing agent, by weight of the coating composition;
    a second mix comprising at least one of a fatty acid derivative, a synthetic resin, an organosilicon compound, a pigment, and a thickener; and
    a high throughput spraying apparatus configured to apply, by spray coating, a coating composition to the substrate, wherein the coating composition is formed by mixing the first and second mix; and
    wherein the coating has no visible efflorescence and no water rub failure.

2. The system for forming the coating of claim 1, wherein the substrate comprises pipes, cement, concrete, mortar, glass, metal, wood, drywall, paper, plastics, brick, clay, tile, stone, granite, marble, foam, foam board, slate, terracotta, ceramics, paint, or combinations thereof.

3. The system for forming the coating of claim 1, wherein the high throughput spraying apparatus is selected from the group consisting of a high volume low pressure (HVLP) paint sprayer, a piston-pump airless paint sprayer, an air-assisted airless paint sprayer, and combinations thereof.

4. The system for forming the coating of claim 1, wherein the high throughput spraying apparatus comprises a piston-pump airless paint sprayer.

5. The system for forming the coating of claim 1, wherein the second mix comprises 0.05 wt % to 5.00 wt % fatty acid derivative, 20.0 wt % to 50.0 wt % synthetic resin, 0.01 wt % to 5.00 wt % organosilicon compound, 0.01 wt % to 2.00 wt % pigment, and 0.01 wt % to 0.50 wt % thickener, by weight of the coating composition.

6. The system for forming the coating of claim 1, wherein the filler comprises recycled glass, calcium carbonate, talc, precipitated amorphous silica, silica sand, or a combination thereof.

7. The system for forming the coating of claim 1, wherein the filler comprises particles having a particle size of less than 425 micrometers.

8. The system of forming the coating of claim 1, wherein:
    the no visible efflorescence comprises no visible efflorescence when exposed to distilled water at 25° C., as measured according to ASTM D1308; and the no water rub failure is measured according to ASTM D5402.

9. The system of forming the coating of claim 1, wherein the fatty acid derivative is at least one material selected from a carboxylic acid group coupled to short chain carbons having 2-6 carbons, carboxylic acid group coupled to medium chain carbons having 6-12 carbons, carboxylic acid group coupled to long chain carbons having 13-21 carbons, carboxylic acid group coupled to very long chain carbons having more than 21 carbons, oleic acid, stearic acid, calcium stearate, magnesium stearate, aluminum stearate, and zinc stearate.

10. The system of forming the coating of claim 1, wherein the synthetic resin comprises an acrylic resin aqueous dispersion.

11. The system of forming the coating of claim 1, wherein the thickener is at least one material selected from clay, cellulose derivatives, galactomannans, microbial polysaccharides, and carboxylated acrylic copolymer.

12. The system of forming the coating of claim 1, wherein the organosilicon compound is at least one material selected from siloxanes, polysiloxanes, alkyl or alkoxy silanes having a short carbon chain of 2-6 carbons, alkyl or alkoxy silanes having a medium carbon chain of 6-12 carbons, alkyl or alkoxy silanes having a long carbon chain of 13-21 carbons, alkyl or alkoxy silanes having a very long carbon chain having more than 21 carbons, glycidoxypropylmethyldiethoxysilane, n-octyl triethoxy silane, amino-functional silanes, vinyl-functional silanes, and polyorganosiloxanes having methyl, ethyl, propyl, cyclohexyl, or phenyl groups.

13. The system for forming the coating of claim 1, wherein said second mix includes a fatty acid derivative, a synthetic resin, an organosilicon compound, a pigment, and a thickener.

* * * * *

UNITED STATES PATENT AND TRADEMARK OFFICE
CERTIFICATE OF CORRECTION

PATENT NO. : 11,472,965 B2  
APPLICATION NO. : 16/851164  
DATED : October 18, 2022  
INVENTOR(S) : Foster-Bey, Jr. et al.

It is certified that error appears in the above-identified patent and that said Letters Patent is hereby corrected as shown below:

In the Specification

Column 19, Line 30, "%" should be -- ¾ --.

Column 19, Lines 38, 42, "ELF" should be -- E/F --.

Signed and Sealed this  
Seventh Day of November, 2023

Katherine Kelly Vidal  
*Director of the United States Patent and Trademark Office*